United States Patent [19]

Takiyama et al.

[11] Patent Number: 5,306,787
[45] Date of Patent: Apr. 26, 1994

[54] METHOD FOR PRODUCING SATURATED POLYESTER

[75] Inventors: Eiichiro Takiyama, Kamakura; Isamu Niikura, Takasakishi; Yositaka Hatano, Higasikanbaragun, all of Japan

[73] Assignee: Showa Highpolymer Co., Ltd., Tokyo, Japan

[21] Appl. No.: 797,033

[22] Filed: Nov. 25, 1991

[30] Foreign Application Priority Data

Nov. 26, 1990 [JP] Japan .................................. 2-317849
Nov. 26, 1990 [JP] Japan .................................. 2-317850

[51] Int. Cl.$^5$ ............................................. C08F 20/00
[52] U.S. Cl. .................................. 525/440; 528/272; 528/302; 528/308; 525/437
[58] Field of Search .................... 528/272, 302, 308; 525/437, 440

[56] References Cited

U.S. PATENT DOCUMENTS 2,999,851 9/1961 Elmer et al. .
4,041,208 8/1977 Seeger et al. ................ 428/424
4,166,873 9/1979 Gilliam et al. ............... 428/35
4,912,177 3/1990 Skochdopole et al. ........ 525/454
5,061,778 10/1991 Uchida et al. ................. 528/45
5,068,143 11/1991 Agger et al. ................... 428/241

FOREIGN PATENT DOCUMENTS 0323700 7/1989 European Pat. Off. .
0393819 10/1990 European Pat. Off. .
1059075 3/1954 France .

Primary Examiner—John Kight, III
Attorney, Agent, or Firm—Sughrue, Mion, Zinn, Macpeak & Seas

[57] ABSTRACT

A method for producing a high molecular weight saturated polyester comprising adding to a saturated polyester with the terminal group being substantially hydroxyl group, having a number average molecular weight of 5,000 or more and being in the molten state, diisocyanate containing isocyanate group the amount of which corresponds to 1/10 to 2 equivalents of the amount of the hydroxyl group.

6 Claims, 3 Drawing Sheets

POLYESTER G
Mn = 12,100

POLYESTER H
Mn = 18,800

METHOD FOR PRODUCING SATURATED POLYESTER

BACKGROUND OF THE INVENTION

1. Field of the Invention

The present invention relates to a method for producing a polyester useful for various applications, comprising further polymerizing a polymeric saturated polyester with the terminal group being substantially a hydroxyl group.

2. Description of the Related Art

It has been well known that saturated polyesters, in particular those containing terephthalate as one component, have been utilized as film, molded articles and glass fiber reinforced plastics for applications in various fields.

They are also useful as base resins for adhesives and paints, so their development has also been progressing recently.

The present invention relates to a method for imparting satisfactory practical properties to polyesters such as those with relatively low melting points to be used as paints and adhesives and aliphatic polyesters not sufficiently provided with film forming properties, etc. by increasing the molecular weights thereof rather than polyesters with relatively high melting points such as polyethylene terephthalate.

As has been well known, the method for synthesizing a polyester of a high molecular weight (the term "high-molecular weight" means a number average molecular weight of about 10,000 or more) depends on the deglycol reaction of the terminal hydroxyl group of a low-molecular polyester.

Hence, the concentration of the terminal group decreases remarkably as the molecular weight increases. Furthermore, a decomposition reaction additionally occurs due to the temperature during the ester exchange, so a limitation is imposed on the molecular weight.

Such a tendency can be distinctively observed in aliphatic polyesters in particular. When a conventional deglycol reaction in reduced pressure is employed for producing a high-molecular saturated polyester as is shown in FIG. 1, for example, it is observed that the molecular weight begins to decrease once the molecular weight reaches the maximum.

In such case, it is very hard to produce an aliphatic polyester with a molecular weight satisfactory for forming tough film by means of the conventional deglycol reaction. In other words, it may be concluded that a film with mechanical properties for practical use cannot be formed from the molecular weights which have been realized by aliphatic polyesters.

Polyesters with aromatic structures also induce similar situations, for example, when the polyesters are to be used as a base resin of an adhesive. The unsatisfactory molecular weights thereof appear as insufficient mechanical properties.

SUMMARY OF THE INVENTION

Thus, the present inventors, as a result of various studies aimed at increasing the molecular weight of such polyesters with lower thermal decomposition temperatures, as much as possible, have found that a high-molecular polyester can be unexpectedly synthesized in a smooth manner without a risk of gelation, by adding to a saturated polyester with the terminal group being substantially a hydroxyl group and being in the molten state at a temperature not less than the melting point thereof, a diisocyanate containing isocyanate group the amount of which corresponds to 1/10 to 2 equivalents of the amount of the hydroxyl group to thus achieve the present invention.

Although according to technical common sense, gelation cannot be avoided in the process of reacting isocyanate with polymers at higher temperatures, the present invention is significant in that the increase in the molecular weight of a polyester can be realized without the risk of gelation, by setting the molecular weight of the polyester and the amount of isocyanate, at 5,000 or more and 1/10 to 2 equivalents of the amount of the hydroxyl group, respectively. The amount of diisocyanate to be used is preferably 0.3 to 1.5 equivalents, more preferably 0.5 to 1.2 equivalents.

If the amount of diisocyanate to be used is represented as the equivalent of the hydroxyl group of isocyanate group and is less than 1/10 equivalent of the hydroxyl group, the effect on the increase in the molecular weight is poor; if the amount is above 2 equivalents, the risk of gelation gets higher.

Although various acid components may be used in a saturated polyester as a principal component of the present invention, the following species may be illustrated;

succinic acid, terephthalic acid (including dimethyl terephthalate), isophthalic acid, adipic acid, sebacic acid, dodecanoic acid, and alicyclic polybasic acids with poor polymerizing potency although the acids have unsaturated bonds, the acids being generally regarded as saturated acids, for example, tetrahydro anhydrous phthalic acid, methyltetrahydro anhydrous phthalic acid, endomethylene tetrahydro anhydrous phthalic acid, and the like.

In terms of melting point, film forming property and cost, two combinations, namely the combination of succinic acid and ethylene glycol and the combination of succinic acid and butanediol 1,4 are preferable. In this case, a part of the succinic acid can be substituted with adipic acid, sebacic acid or decamethylene dicarboxylic acid, and the substituted proportion is preferably 50 mol % or less.

In view of desirable properties such as toughness, adhesive property and the like, an acid component in the polyester is a compound of a carbon number of 5 or more.

Because anhydrous phthalic acid has a sublimation property, it is difficult to synthesize a high-molecular polyester by means of this acid alone. However, the concurrent use of the acid with other acids is possible. Polyhydric alcohols must be of the type in which at least a part thereof is transferred to the outside of the ester by means of the temperature and the pressure during the deglycol reaction, because polyester is polymerized through the deglycol reaction.

Examples thereof include for example ethylene glycol, propylene glycol, butanediol 1,3, butanediol 1,4, pentanediol 1,5, 3-methyl-pentanediol 1,5, hexanediol 1,6, nonanediol 1,9, diethylene glycol, dipropylene glycol, neopentyl glycol and 2-methyl propanediol 1,3. A part of a polyhydric alcohol component, for example, a part of butanediol 1,4, can be substituted with hexanediol 1,6 or decamethylene glycol.

The amount of high-boiling polyhydric alcohol, for example, hydrogenated bisphenol A, bisphenol A ethylene oxide adduct, bisphenol A propylene oxide adduct, polyethylene glycol, and polytetramethylene glycol, is limited to 50 mol % or less. Alkylene monoepoxide can be used under the same conditions.

For polyester production, esterification is effected up to a desirable acid number (10 or less generally) in the excess of polyhydric alcohol, followed by deglycol reaction in the presence of a reaction catalyst such as a tetraalkyl titanium compound under vacuo. Said reaction catalyst may be added at the outset of esterification reaction.

A desired amount of diisocyanate is added in the stage where a required molecular weight is achieved.

No limitation is imposed on the types of diisocyanate to be used in the present invention, and commercially available ones may be used as they are.

Their examples include 2,4-tolylenediisocyanate, a mixture of 2,4-tolylenediisocyanate and 2,6-tolylenediisocyanate, diphenylmethane diisocyanate, p,p'-diphenyl diisocyanate, 1,6-naphthylene diisocyanate, xylylene diisocyanate, hydrogenated xylylene diisocyanate, isophorone diisocyanate, and hexamethylene diisocyanate.

The reaction proceeds simultaneously on the addition of diisocyanate, and the reaction is then completed in a few minutes.

The saturated polyester with the increased molecular weight by means of diisocyanate in accordance with the present invention can be subjected to the applications mainly as adhesives, sticking agents, molded articles, films and the like.

BRIEF DESCRIPTION OF THE DRAWINGS

FIG. 2-B is a graph representing the results of the GPC measurement of the molecular weight of Polyester B in Example 1.

FIG. 3-B is a graph representing the results of the GPC measurement of the molecular weight of Polyester H in Example 4.

DESCRIPTION OF THE PREFERRED EMBODIMENTS

Methods of the present invention are illustrated with reference to the following examples, but the invention is not intended to be limited only to these following examples.

EXAMPLE 1

Figure 1:
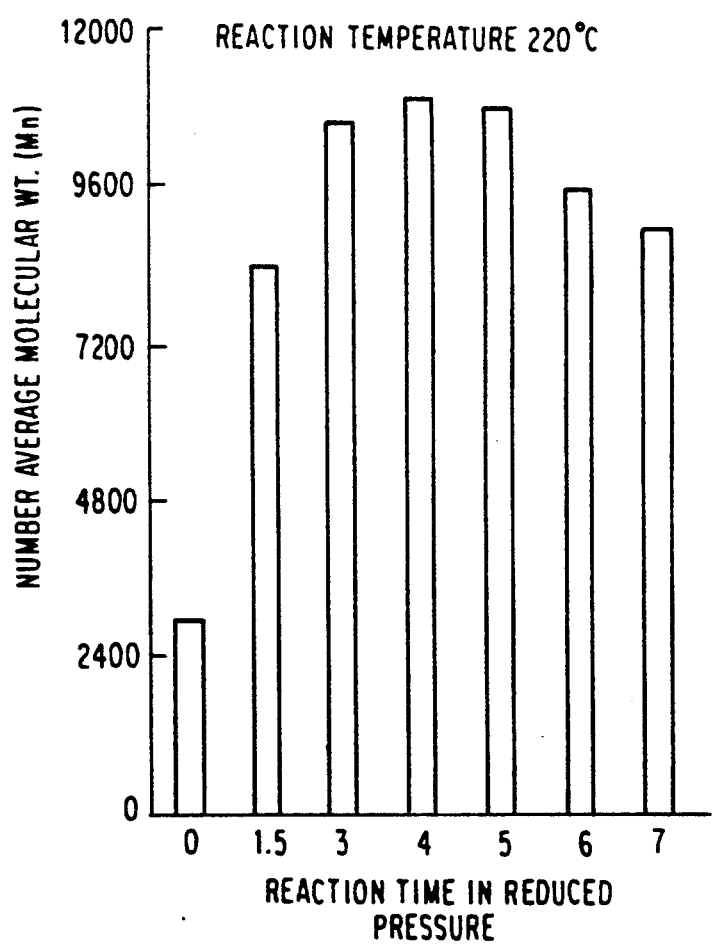
FIG. 1 is a graph representing the relation of the reaction time and the distribution of molecular weights in the process of producing a high-molecular saturate polyester according to the conventional reaction in reduced pressure.
Figure 2A:
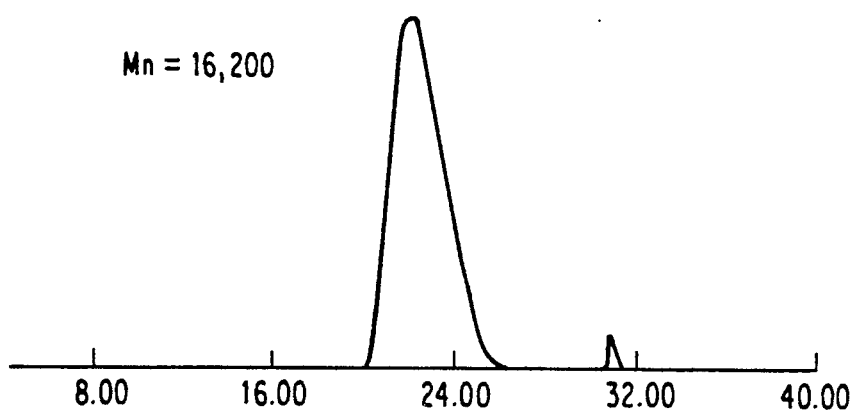
FIG. 2-A is a graph representing the results of the GPC measurement of the molecular weight of Polyester A in Example 1.
Figure 2B:
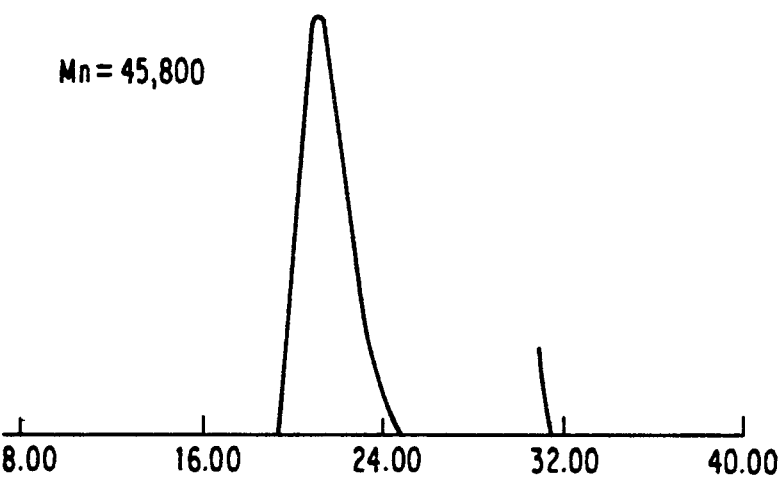

In a 1 liter separable flask equipped with a stirrer, a fractionation condenser, a gas introduction tube, and a thermometer, were placed 206 g of butanediol 1,4 and 236 g of succinic acid, followed by esterification in a nitrogen stream at 210° to 220° C. to render the acid number of the mixture to 7.9. Subsequently, 1.2 g of tetrabutyl titanate was added prior to the exchange of the condenser. Deglycol reaction was effected about five hours initially in a reduced pressure of 3.5 Torr and finally in a reduced pressure of 0.6 Torr. The number average molecular weight measured by GPC was 16,200 (see FIG. 2-A, Polyester A). To the resulting reaction mixture was added 4 g of hexamethylene diisocyanate (OH/NCO=1/0.8) at a temperature of 190° C. The number average molecular weight of the high-molecular polyester after 10-min reaction was 45,800 (see FIG. 2-B, Polyester B), but gelation did not occur. The high-molecular polyester thus obtained had a melting point of about 120° C., being capable of forming film, and was stretched into a tough film four times the original size by biaxial orientation, with the tensile strength of the film being 13.4–16.1 kg/mm².

EXAMPLE 2

Into a 1 liter separable flask equipped with a stirrer, a fractionation condenser, a gas introducing tube, and a thermometer, were placed 202 g of succinic acid, 216 g of butanediol 1,4 and 29 g of adipic acid, followed by esterification at 200° to 210° C. to render the acid number of the mixture to 9.1. The condenser was subsequently exchanged before adding 1 g of tetraisopropyl titanate at 210° to 220° C. in a final reduced pressure of 0.7 Torr, to synthesize a polyester C of a number average molecular weight of 10,200.

The temperature was continuously lowered to 190° C., followed by addition of 5 g of hexamethylene diisocyanate, and reacted for 15 minutes. The ratio OH/NCO was about 1/1. Gelation did not occur.

The polyester D obtained was of a number average molecular weight of 48,900, melting point of about 106° C. and slightly yellowish white in wax-like form, and was observed to become a tough film.

EXAMPLE 3

In a 1 liter separable flask equipped with a stirrer, a fractionation condenser, a gas introducing tube, and a thermometer, were placed 150 g of ethylene glycol and 236 g of succinic acid, followed by esterification in nitrogen gas stream at 195° to 210° C. to render the acid number of the mixture to 7.9. Subsequently, 1 g of tetrabutyl titanate was added after the exchange of the condenser. The atmosphere was at a temperature of 210° to 220° C. and a finally reduced pressure of 0.7 Torr, to synthesize a polyester E of a number average molecular weight of 11,800. Then, the temperature was lowered to 190° C., followed by addition of 5.5 g of diphenylmethane diisocyanate (OH/NCO=1/0.85) for reaction for 10 minutes. The number average molecular weight was about 40,000 and no gelation occurred.

The polyester F obtained was slightly yellowish brown in wax-like form, and was observed to have a melting point of about 105° C. and to make tough films.

EXAMPLE 4

In a 1 liter separable flask equipped with a stirrer, a fractionation condenser, a gas introduction tube, and a thermometer, were placed 92 g of propylene glycol, 75 g of ethylene glycol, 88 g of adipic acid, 121 g of sebacic acid and 133 g of isophthalic acid, followed by esterification in nitrogen gas at 190° to 200° C. to render the acid number of the mixture to 9.1. Subsequently, 1.5 g of tetraisopropyl titanate was added after the exchange of the condenser. Deglycol reaction was effected at 210° to 220° C. for six hours initially in a reduced pressure of about 3 Torr and finally in a reduced pressure of 0.8 Torr, to obtain a polyester G. The number average molecular weight measured by GPC was 12,100.

The temperature was lowered to 190° C., followed by addition 3 g of diphenylmethane diisocyanate (OH/NCO=1/0.3) and reacted for 10 minutes. The number average molecular weight increased to about 18,800, and a polyester H was obtained. Gelation did not occur.

Figure 3A:
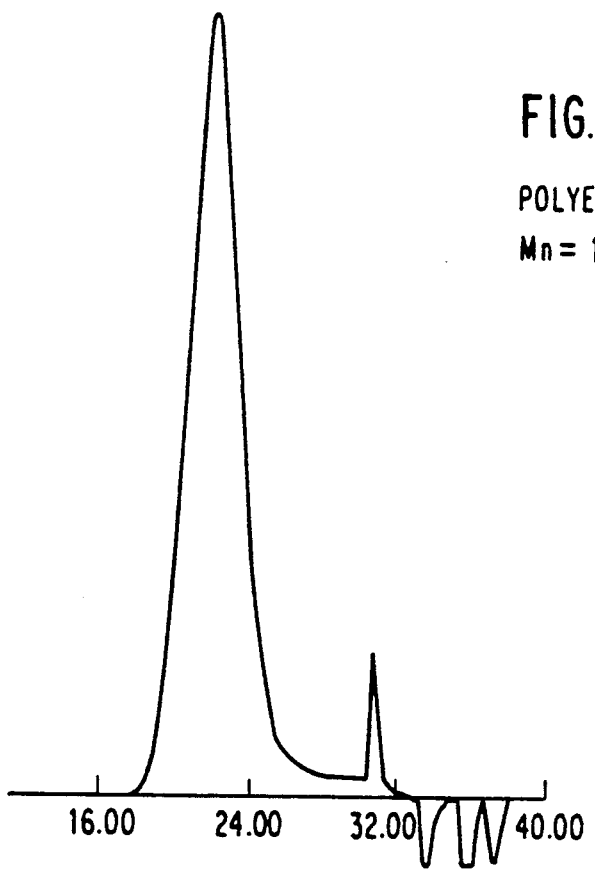
FIG. 3-A is a graph representing the results of the GPC measurement of the molecular weight of Polyester G in Example 4.
Figure 3B:
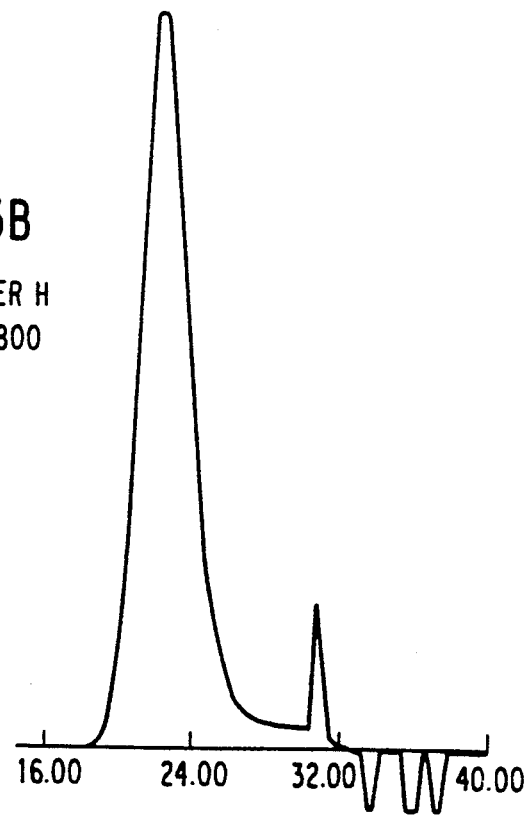

The change in the molecular weights both of Polyesters G and H, measured by GPC, is shown in FIGS. 3-A and 3-B.

The polyesters with the molecular weights increased via diphenylmethane diisocyanate were useful as a raw material for adhesives.

EXAMPLE 5

In a 2 liter separable flask equipped with a stirrer, a fractionation condenser, a gas introduction tube, and a thermometer, were placed 432 g of butanediol 1,3, 292 g of adipic acid and 332 g of isophthalic acid, followed by esterification in nitrogen gas at 200° to 210° C. to render the acid number of the mixture to 8.7. Subsequently, 1.5 g of tetraisopropyl titanate was added after the exchange of the condenser. Deglycol reaction was effected at 210° to 220° C. about six hours initially in a reduced pressure of 5 Torr and finally in a reduced pressure of 0.6 Torr to obtain a polyester I of a number average molecular weight of 10,600.

The temperature was lowered to 180° C., followed by addition of 20 g of isophorone diisocyanate (OH/NCO=1/0.9), and was left to react for 15 minutes.

A high-molecular polyester J of the number average molecular weight of 40,500 was obtained, without gelation.

Polyester J with tough rubber elasticity was applied to an surface area of 25 mm×15 mm of two steel boards heated at 150° C. The boards were bonded together and cooled down to room temperature. The adhesive strength was measured by means of tensile shear. It was 69 to 91 kg/cm$^2$.

What is claimed is:

1. A method for producing a high molecular weight saturated polyester having a melting point of 105° to 120° C. and film forming properties, comprising adding a diisocyanate to a saturated aliphatic polyester in a molten state at a temperature not lower than the melting point thereof, wherein said saturated aliphatic polyester is obtained by the reaction of (a) succinic acid and butanediol-1,4, (b) succinic acid, adipic acid and butanediol-1,4, or (c) succinic acid and ethylene glycol and has terminal groups being substantially hydroxyl groups, and a number average molecular weight of 10,000 or more, and wherein said diisocyanate has an isocyanate group the amount of which corresponds to from 1/10 to 2 equivalents of the amount of the hydroxyl group of the saturated aliphatic polyester.

2. The method claimed in claim 1, wherein the amount of diisocyanate containing isocyanate group corresponds to the amount of 0.3 to 1.5 equivalents of the hydroxyl group.

3. The method claimed in claim 1, wherein the amount of diisocyanate containing isocyanate group corresponds to the amount of 0.5 to 1.2 equivalents of the hydroxyl group.

4. The method claimed in claim 1, wherein the saturated aliphatic polyester has a number average molecular weight of from 10,200 to 16,200.

5. The method claimed in claim 1, wherein the amount of said diisocyanate is from 0.2 to 5 parts by weight per 100 parts by weight of the saturated aliphatic polyester.

6. A method claimed in claim 1, wherein said diisocyanate is hexamethylenediisocyanate.

* * * * *